(12) United States Patent
Polastri et al.

(10) Patent No.: US 10,308,830 B2
(45) Date of Patent: Jun. 4, 2019

(54) FLUOROPOLYMER COMPOSITION

(71) Applicant: SOLVAY SPECIALTY POLYMERS ITALY S.P.A., Bollate (IT)

(72) Inventors: Fabio Polastri, Monza (IT); Valeriy Kapelyushko, Alessandria (IT); Pasqua Colaianna, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 0 days.

(21) Appl. No.: 15/320,307

(22) PCT Filed: Jun. 16, 2015

(86) PCT No.: PCT/EP2015/063486
§ 371 (c)(1),
(2) Date: Dec. 19, 2016

(87) PCT Pub. No.: WO2015/193321
PCT Pub. Date: Dec. 23, 2015

(65) Prior Publication Data
US 2017/0145242 A1  May 25, 2017

(30) Foreign Application Priority Data
Jun. 19, 2014  (EP) .................... 14173110

(51) Int. Cl.
| | |
|---|---|
| *C09D 127/18* | (2006.01) |
| *C09D 179/08* | (2006.01) |
| *C08L 79/08* | (2006.01) |
| *C08L 27/18* | (2006.01) |
| *C08G 73/16* | (2006.01) |
| *C08G 14/06* | (2006.01) |
| *C08L 61/34* | (2006.01) |

(52) U.S. Cl.
CPC .......... *C09D 127/18* (2013.01); *C08G 73/16* (2013.01); *C08L 27/18* (2013.01); *C08L 79/08* (2013.01); *C09D 179/08* (2013.01); *C08G 14/06* (2013.01); *C08L 61/34* (2013.01)

(58) Field of Classification Search
CPC ..... C09D 127/18; C09D 179/08; C08L 79/08; C08L 27/18
USPC ............................................. 524/87
See application file for complete search history.

(56) References Cited

U.S. PATENT DOCUMENTS

| | | |
|---|---|---|
| 4,029,868 A | 6/1977 | Carlson |
| 5,543,516 A | 8/1996 | Ishida |
| 5,626,907 A | 5/1997 | Hagiwara et al. |
| 5,677,404 A | 10/1997 | Blair |
| 5,688,885 A | 11/1997 | Blair |
| 5,703,185 A | 12/1997 | Blair |
| 2008/0200084 A1 | 8/2008 | Angus et al. |
| 2009/0224204 A1 | 9/2009 | Marion et al. |
| 2011/0166025 A1 | 7/2011 | Jentzer et al. |
| 2012/0177911 A1 | 7/2012 | Kimura et al. |
| 2013/0033827 A1 | 2/2013 | Das et al. |
| 2013/0062099 A1 | 3/2013 | Hunrath |
| 2013/0101743 A1 | 4/2013 | Wu et al. |
| 2013/0209812 A1* | 8/2013 | Gorodisher .......... C09D 179/04 428/458 |
| 2013/0237722 A1 | 9/2013 | Vidal et al. |

(Continued)

FOREIGN PATENT DOCUMENTS

| | | |
|---|---|---|
| CN | 102850726 A | 1/2013 |
| EP | 0789728 A1 | 8/1997 |
| EP | 1991519 A1 | 11/2008 |

(Continued)

OTHER PUBLICATIONS

Alger, Mark S.M., "Polymer Science Dictionary", 1989, London School of Polymer Technology, Polytechnic of North London, UK published by Elsevier Applied Science, p. 476.

*Primary Examiner* — Deve E Valdez

(57) ABSTRACT

The invention pertains to a fluoropolymer composition comprising: —at least one fluoropolymer [polymer (A)]; —at least one benzoxazine compound [compound (B)] of formula (I), wherein each of $R_a$, equal to or different at each occurrence, is H or a $C_1$-$C_{12}$ alkyl group; $R_b$ is a $C_1$-$C_{36}$ hydrocarbon group, possibly comprising heteroatoms, optionally comprising at least one benzoxazine group; j is zero or an integer of 1 to 4; each of $R_c$, equal or different at each occurrence, is a halogen or a $C_1$-$C_{36}$ hydrocarbon group, possibly comprising heteroatoms, optionally comprising at least one benzoxazine group; —at least one aromatic polyimide polymer [polymer (PI)]; —at least one organic solvent [solvent (S)], and to a method for coating a surface, specifically a metal surface, with a fluoropolymer, using said fluoropolymer composition.

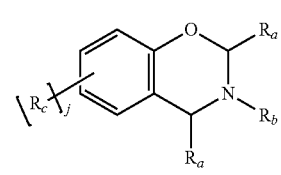

Formula (I)

16 Claims, No Drawings

(56) References Cited

U.S. PATENT DOCUMENTS

2013/0317155 A1   11/2013   Hunrath et al.

FOREIGN PATENT DOCUMENTS

| WO | 95021216 A1   | 8/1995  |
| WO | 2011154661 A1 | 12/2011 |
| WO | 2013119388 A1 | 8/2013  |
| WO | 2013161088 A1 | 10/2013 |
| WO | 2014001100 A1 | 1/2014  |

* cited by examiner

FLUOROPOLYMER COMPOSITION

CROSS-REFERENCE TO RELATED APPLICATIONS

This application is a U.S. national stage entry under 35 U.S.C. § 371 of International Application No. PCT/EP2015/063486 filed Jun. 16, 2015, which claims priority to European application No. EP 14173110.9 filed on Jun. 19, 2014. The entire contents of these applications are explicitly incorporated herein by this reference.

TECHNICAL FIELD

The present invention relates to a fluoropolymer composition suitable for adhering a fluoropolymer coating onto a surface, in particular onto a metal surface, and a method for coating a surface, specifically a metal surface, with a fluoropolymer, using said fluoropolymer composition.

BACKGROUND ART

Because of its excellent properties in chemical resistance, heat resistance, non-stickiness, and the like, fluoropolymers are used as preferred coating materials for different surfaces, including notably metal surfaces, for example, in applications which include linings for chemical units, which are required to be corrosion resistant; coatings for rice cookers, and cooking utensils that are required to be corrosion resistant and non-sticky.

However, the excellent non-stickiness inherent properties of fluoropolymer also often results in insufficient adhesion to substrate surfaces, in particular to metal surfaces, and a variety of solutions have been developed up to now for improving such adhesion.

More particularly, thermoplastic fluoropolymers which are known for possessing film-forming properties, such as tetrafluoroethylene/perfluoroalkyl vinyl ether copolymers (PFA), tetrafluoroethylene/hexafluoropropylene copolymers (FEP), ethylene/tetrafluoroethylene (ETFE) and ethylene/chlorotrifluoroethylene (ECTFE) polymers, and the like, are capable of exhibiting fluidity at or above their melting points and of adhering to metals with an adhesion strength too weak to be of any practical use. Thus, the conventional approach has been to chemically or physically roughen the metal surface, followed by a thermal fusion or adhering with the intermediary of an adhesive layer (also called primer) between the outmost fluoropolymer layer and the metal, which also has to possess outstanding adhesion properties towards additional top-coat (outer) layers made from fluoropolymers.

For conferring appropriate adhesive properties, primer compositions which have been suggested in the past, typically comprise certain aromatic polymers, including notably polyamideimide (PAI), polyimides (PI), sulfone polymer (SP) and the like.

In order to ensure optimized mixing between these components, it is current practice mixing the fluoropolymer and the aromatic polymer in an organic solvent, typically in N-methylpyrrolidone (NMP), possibly in admixture with other solvents.

Thus, EP 0789728 A (E.I. DUPONT DE NEMOURS) 2 Sep. 1998 discloses a primer composition comprising notably a polyether sulfone, a polyamideimide and/or a polyimide, a fluororesin and an organic solvent. N-methylpyrrolidone and its mixtures are the sole solvents which are mentioned and exemplified.

Similarly, U.S. Pat. No. 5,626,907 (E.I. DUPONT DE NEMOURS) 6 May 1997 discloses a primer composition comprising notably a fluororesin, a polyether sulfone polymer, at least one polymer selected from a polyimide and a polyamideimide, solubilized or dispersed in an organic solvent. This document teaches that the organic solvents which can be used include N-methylpyrrolidone either alone or in admixture with other solvents, like diacetone alcohol or xylene.

Nevertheless, a continuous need exists for primer composition possessing improved adhesion after prolonged exposure to harsh conditions (notably exposure to water vapour).

The present invention thus provides a solution for improving adhesion behaviour of fluoropolymer compositions to metal surfaces.

SUMMARY OF INVENTION

The invention thus pertains to a fluoropolymer composition comprising:
- at least one fluoropolymer [polymer (A)];
- at least one benzoxazine compound [compound (B)] of formula (I):

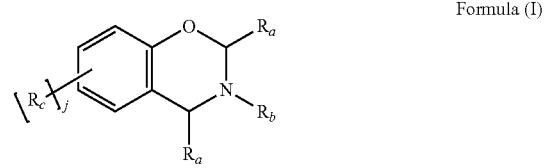

Formula (I)

wherein each of $R_a$, equal to or different at each occurrence, is H or a $C_1$-$C_{12}$ alkyl group; $R_b$ is a $C_1$-$C_{36}$ hydrocarbon group, possibly comprising heteroatoms, optionally comprising at least one benzoxazine group; j is zero or an integer of 1 to 4; each of $R_c$, equal or different at each occurrence, is a halogen or a $C_1$-$C_{36}$ hydrocarbon group, possibly comprising heteroatoms, optionally comprising at least one benzoxazine group;
- at least one aromatic polyimide polymer [polymer (PI)];
- at least one organic solvent [solvent (S)].

The Applicant has found that the particular combination of benzoxazine compound and aromatic polyimide polymer, as above detailed, is effective in providing fluoropolymer compositions which possess outstanding adhesion propertied towards substrates, including metal substrates, even under harsh prolonged conditions.

The expression benzoxazine compound (B) is hence within the frame of the present invention used to denote compounds, as above detailed, which are otherwise often referred to as benzoxazine resins.

Compound (B) is a benzoxazine compound; these compounds are generally manufactured by reaction of a primary amine comprising at least one —$NH_2$ group, a phenol compound comprising at least one phenolic hydroxylic group, and an aliphatic aldehyde, according to the reaction scheme below:

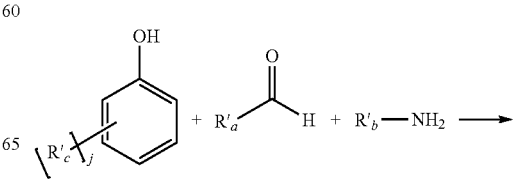

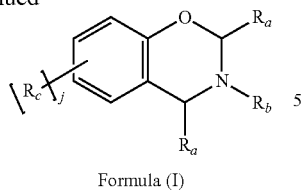

Formula (I)

wherein R'$_a$ is H or a $C_1$-$C_{12}$ alkyl group; R'$_b$ is a $C_1$-$C_{36}$ hydrocarbon group, possibly comprising heteroatoms, optionally comprising at least one additional —NH$_2$ group; j is zero or an integer of 1 to 4; each of R'$_c$, equal or different at each occurrence, is a halogen or $C_1$-$C_{36}$ hydrocarbon group, possibly comprising heteroatoms, optionally comprising at least one additional phenol group; and R$_b$ is a $C_1$-$C_{36}$ hydrocarbon group, possibly comprising heteroatoms, optionally comprising at least one benzoxazine group; j is zero or an integer of 1 to 4; each of R$_c$, equal to or different at each occurrence, is a halogen or a $C_1$-$C_{36}$ hydrocarbon group, possibly comprising heteroatoms, optionally comprising at least one benzoxazine group; each of R$_a$, equal to or different at each occurrence is H or a $C_1$-$C_{12}$ alkyl group.

The aliphatic aldehyde used in the preparation of the benzoxazine compound include formaldehyde and precursors thereof, including notably paraformaldehyde, polyoxymethylene; and aliphatic aldehydes of formula R$_a$—CHO, wherein R$_a$ is H or a $C_1$-$C_{12}$ alkyl group, which can be advantageously linear or branched, cyclic or acyclic, saturated or unsaturated, or combinations thereof. Useful aldehydes, other than formaldehyde, include notably crotonaldehyde, acetaldehyde, proprionaldehyde, butyraldehyde, and heptaldehyde.

The compound (B) can be notably manufactured by the method described in U.S. Pat. No. 5,543,516 (EDISON POLYMER INNOVATION) Jun. 8, 1996, although other methods can be equally conveniently used.

Because the primary amine as above detailed can comprise more than one groups —NH$_2$, and/or because the phenol compound can comprise more than one phenolic hydroxylic groups, the resulting benzoxazine compound may comprise more than one benzoxazine groups.

Generally, phenol compounds having two phenolic hydroxylic groups and/or primary amines comprising two groups —NH$_2$ can be advantageously used.

The primary amine maybe an aliphatic amine or an aromatic amine. Useful mono-amines include, for example methyl-, ethyl-, propyl-, hexyl-, octyl-, dodecyl-amine, aniline and substituted derivatives thereof. Representative diamines are notably 4,4'-methylenedianiline, ethylene diamine, 1,3-propane diamine.

Examples of monofunctional phenol compounds include phenol, cresol, 2-bromo-4-methyphenol, 2-allylphenol, 4-aminophenol; examples of difunctional phenol compounds include phenolphthalein, bisphenol, 4,4'-methylene-di-phenol; 4,4'-dihydroxybenzophenone; bisphenol-A, bisphenol F, bisphenol AF.

The compound (B) preferably complies with any of formulas (II), (III) and (IV) herein below:

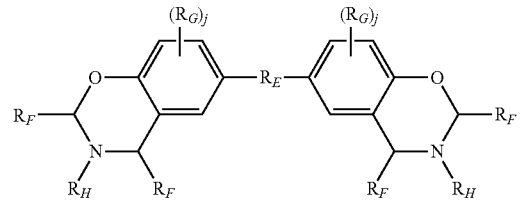

Formula (II)

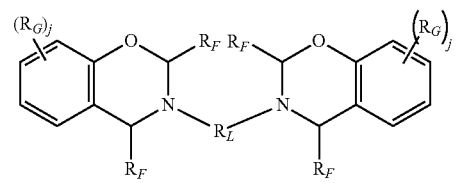

Formula (III)

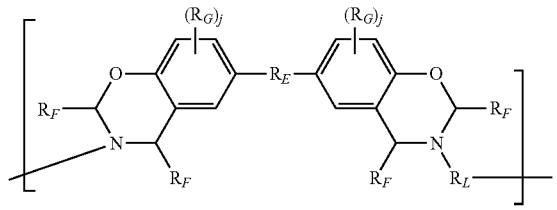

Formula (IV)

wherein

R$_E$ is a covalent bond or a divalent group selected from the group consisting of —O—, —S—, —SO$_2$—, —(CH$_2$)$_m$—, with m being an integer from 1 to 6, —C(O)—, —C(CF$_3$)$_2$—, —(CF$_2$)$_n$—, n being an integer from 1 to 6, and groups of formulas:

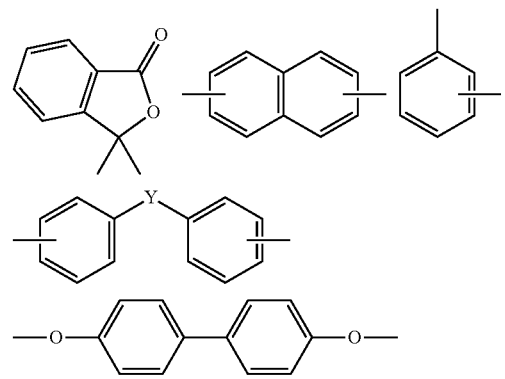

with Y being a covalent bond or a divalent group selected from the group consisting of —O—, —S—, —SO$_2$—, —(CH$_2$)$_m$—, with m being an integer from 1 to 6, —C(O)—, —C(CF$_3$)$_2$—, —(CF$_2$)$_n$—, n being an integer from 1 to 6;

R$_L$ is a divalent group selected from the group consisting of divalent $C_1$-$C_{12}$ aliphatic groups, linear or branched when possible, or an aromatic group of formula:

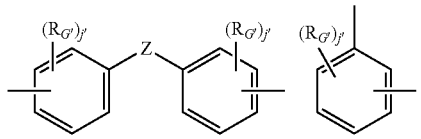

with Z being a covalent bond or a divalent group selected from the group consisting of —O—, —S—, —SO$_2$—, —(CH$_2$)$_m$—, with m being an integer from 1 to 6, —C(O)—, —C(CF$_3$)$_2$—, —(CF$_2$)$_n$—, n being an integer from 1 to 6;

j and j', equal to or different from each other at each occurrence, is zero or is an integer of 1 to 3;

each of R$_G$ and R$_{G'}$, equal or different at each occurrence, is a halogen or a C$_1$-C$_{36}$ hydrocarbon group, possibly comprising heteroatoms;

each of R$_F$, equal to or different at each occurrence, is H or a C$_1$-C$_{12}$ alkyl group;

each of R$_H$ is a C$_1$-C$_{36}$ hydrocarbon group, possibly comprising heteroatoms.

Compound (B) preferably complies with formula (II), as above detailed.

Even more preferably, compound (B) is selected from the group consisting of compounds (B-1) to (B-5) listed below:

Formula (B-1)

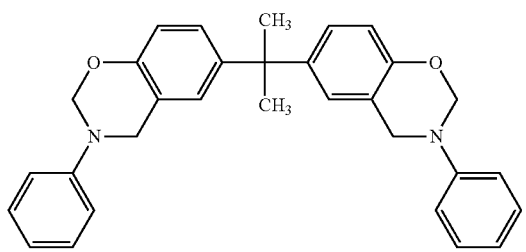

Formula (B-2)

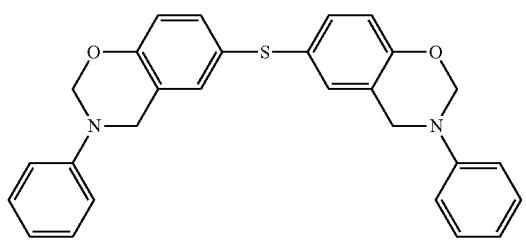

Formula (B-3)

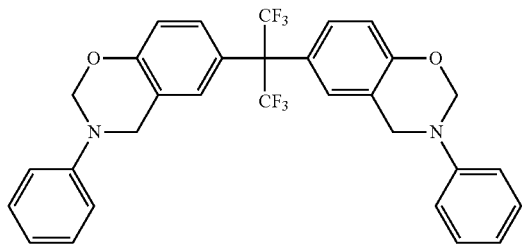

Formula (B-4)

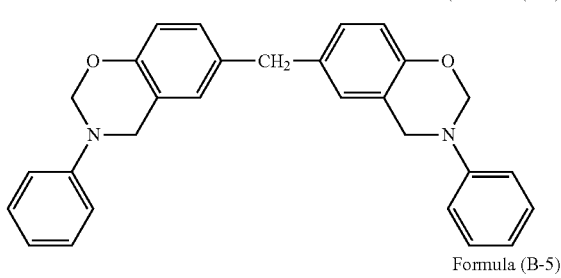

Formula (B-5)

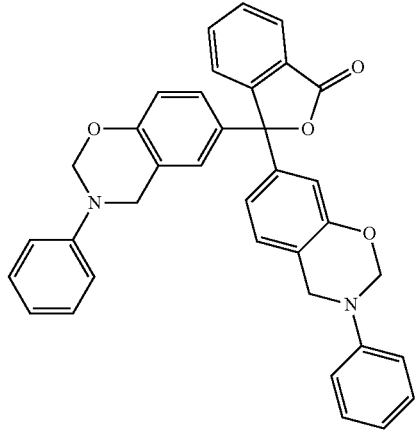

Of those, compound (B-1) has been found to provide particularly good results.

Without being bond by this theory, the Applicant considers that the compound (B), during processing of the composition of the invention at high temperature, would homopolymerize to form a crosslinking network, as well known for benzoxazine resins, hence conferring to the coated layer obtained from the composition of the invention additional adhesion and cohesion.

The fluoropolymer composition of the invention advantageously comprises compound (B) in an amount of from 1 to 50% wt, preferably 2 to 40% wt, more preferably from 3 to 30% wt (extremes included), with respect to the total weight of the composition.

The choice of the solvent (S) is not particularly critical. Solvents traditionally used for the manufacture of fluoropolymer compositions can be used, including N-methylpyrrolidone, diacetone alcohol, xylene, either alone or in admixture with each other or with other solvents.

According to certain preferred embodiments, the at least one organic solvent (S) is a solvent mixture [mixture (M)] comprising dimethylsulfoxide (DMSO) and at least one solvent selected from the group consisting of diesters of formula (I$_{de}$) and ester-amide of formula (I$_{ea}$):

$$R^1\text{—OOC-}A_{de}\text{-COO—}R^2 \qquad (I_{de})$$

$$R^1\text{—OOC-}A_{ea}\text{-CO—}NR^3R^4 \qquad (I_{ea})$$

wherein:

R$^1$ and R$^2$, equal to or different from each other, are independently selected from the group consisting of C$_1$-C$_{20}$ hydrocarbon groups;

R$^3$ and R$^4$, equal to or different from each other, are independently selected from the group consisting of hydrogen, C$_1$-C$_{36}$ hydrocarbon groups, possibly substituted, being understood that R$^3$ and R$^4$ might be part of a cyclic moiety including the nitrogen atom to which they are bound, said cyclic moiety being possibly substituted and/or possibly comprising one or more than one additional heteroatom, and mixtures thereof;

$A_{de}$ and $A_{ea}$, equal to or different from each other, are independently a linear or branched divalent alkylene group.

The mixture (M) can comprise, in addition to DMSO, a mixture of more than one diester of formula ($I_{de}$), a mixture of more than one esteramide of formula ($I_{ea}$), or can comprise a mixture of one or more than one diester ($I_{de}$) and one or more than one esteramide ($I_{ea}$). The Applicant thinks, without being bound by this theory, that the use of mixtures of one ore more diesters ($I_{ea}$) and/or one of more esteramides ($I_{ea}$) can provide improved drying properties for the composition.

In formulae ($I_{de}$) and ($I_{ea}$), $R^1$ and $R^2$, equal to or different from each other, are preferably selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, and mixtures thereof.

With regards to the expression "$C_1$-$C_{20}$ alkyl" used in formulae ($I_{de}$) and ($I_{ae}$) is used according to its usual meaning and it encompasses notably linear, cyclic, branched saturated hydrocarbon chain having from 1 to 20 carbon atoms and preferably from 1 or 2 to 10 carbon atoms.

Similarly, the expression "$C_1$-$C_{20}$ aryl" is used according to its usual meaning and it encompasses notably aromatic mono- or poly-cyclic groups, preferably mono- or bi-cyclic groups, comprising from 6 to 12 carbon atoms, preferably phenyl or naphthyl.

Still, the expression "$C_1$-$C_{20}$ arylalkyl" is used according to its usual meaning and it encompasses linear, branched or cyclic saturated hydrocarbon groups comprising, as substituent, one or more than one aromatic mono- or poly-cyclic group, such as, notably benzyl group.

Finally, the expression "$C_1$-$C_{20}$ alkylaryl" is used according to its usual meaning and it encompasses aromatic mono- or poly-cyclic groups comprising as substituent, one or more than one alkyl group, e.g. one or more than one linear, cyclic, branched saturated hydrocarbon chain having from 1 to 14 carbon atoms and preferably from 1 or 2 to 10 carbon atoms.

More preferably $R^1$ and $R^2$ in formulae ($I_{de}$) and ($I_{ae}$), equal to or different from each other, are preferably selected from the group consisting of methyl, ethyl, n-propyl, isopropyl, n-butyl, isobutyl, terbutyl, sec-butyl, 2-ethyl-butyl, n-pentyl, isopentyl, sec-pentyl, cyclopentyl, n-hexyl, isohexyl, sec-hexyl, 2-ethylhexyl, sec-heptyl, 3-methyl-hexyl, 4-methyl-hexyl, 1-ethyl-pentyl, 2-ethyl-pentyl, 3-ethyl-pentyl, n-octyl, isooctyl, 3-methyl-heptyl, n-nonyl, n-decyl, n-undecyl, n-dodecyl, n-tridecyl, n-tetradecyl, n-pentadecyl, cyclohexyl, phenyl and benzyl.

In formula ($I_{ea}$), $R^3$ and $R^4$, equal to or different from each other, are preferably selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituent, possibly having one or more than one heteroatom, and of cyclic moieties comprising both $R^3$ and $R^4$ and the nitrogen atom to which they are bound, said cyclic moieties possibly comprising one or more than one heteroatom, e.g. an oxygen atom or an additional nitrogen atom.

In formula ($I_{ea}$), $R^3$ and $R^4$, equal to or different from each other, are more preferably selected from the group consisting of methyl, ethyl, hydroxyethyl, n-propyl, isopropyl, n-butyl, isobutyl, terbutyl, n-pentyl, isopentyl, hexyl, cyclohexyl, most preferably from the group consisting of methyl, ethyl and hydroxyethyl.

According to a first embodiment of the invention, A in formulae ($I_{de}$) and ($I_{ea}$) is $C_3$-$C_{10}$ branched divalent alkylene.

According to this first embodiment, A is preferably selected from the group consisting of the following:
$A_{MG}$ groups of formula $MG_a$ —CH(CH$_3$)—CH$_2$—CH$_2$— or $MG_b$-CH$_2$—CH$_2$—CH(CH$_3$)—,
$A_{ES}$ groups of formula $ES_a$ —CH(C$_2$H$_5$)—CH$_2$—, or $ES_b$—CH$_2$—CH(C$_2$H$_5$)—; and
mixtures thereof.

In one more preferred variant of this first embodiment, the mixture (M) comprises, in addition to DMSO:
(i) at least one of the diester ($I'_{de}$) and at least one diester ($I''_{de}$), possibly in combination with at least one diester of formula ($II_{de}$); or
(ii) at least one of the esteramide ($I'_{ea}$) and at least one esteramide ($I''_{ea}$), possibly in combination with at least one esteramide of formula ($II_{ea}$); or
(iii) combinations of (i) and (ii),
wherein:
($I'_{de}$) is $R^1$—OOC-$A_{MG}$-COO—$R^2$
($I'_{ea}$) is $R^1$—OOC-$A_{MG}$-CO—NR$^3$R$^4$
($I''_{de}$) is $R^1$—OOC-$A_{ES}$-COO—$R^2$
($I''_{ea}$) is $R^1$—OOC-$A_{ES}$-CO—NR$^3$R$^4$;
($II_{ea}$) is $R^1$—OOC—(CH$_2$)$_4$—CO—NR$^3$R$^4$, and
($II_{de}$) is $R^1$—OOC—(CH$_2$)$_4$—COO—$R^2$,
wherein:
$A_{MG}$ is of formula $MG_a$ —CH(CH$_3$)—CH$_2$—CH$_2$— or $MG_b$ —CH$_2$—CH$_2$—CH(CH$_3$)—,
$A_{ES}$ is of formula $ES_a$ —CH(C$_2$H$_5$)—CH$_2$—, or $ES_b$—CH$_2$—CH(C$_2$H$_5$)—; and wherein $R^1$ and $R^2$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups;
$R^3$ and $R^4$, equal to or different from each other, are selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituent, possibly having one or more than one heteroatom, and of cyclic moieties comprising both $R^3$ and $R^4$ and the nitrogen atom to which they are bound, said cyclic moieties possibly comprising one or more than one heteroatom, e.g. an oxygen atom or an additional nitrogen atom.

In above mentioned formulae ($I'_{de}$), ($I''_{de}$), and ($II_{de}$), ($I'_{ea}$), ($I''_{ea}$) and ($II_{ea}$), $R^1$ and $R^2$ are preferably methyl groups, while $R^3$ and $R^4$, equal to or different from each other, are preferably selected from the group consisting of methyl, ethyl, hydroxyethyl.

According to this variant, mixture (M) can comprise, in addition to DMSO:
(j) a diester mixture consisting essentially of:
from 70 to 95% by weight of diester of formula ($I'_{de}$);
from 5 to 30% by weight of diester of formula ($I''_{de}$), and
from 0 to 10% by weight of diester of formula ($II_{de}$), as above detailed; or
(jj) an esteramide mixture consisting essentially of:
from 70 to 95% by weight of esteramide of formule ($I'_{ea}$);
from 5 to 30% by weight of esteramide of formula ($I''_{ea}$), and from 0 to 10% by weight of esteramide of formule ($II_{ea}$), as above detailed; or (jjj) mixtures of (j) and (jj), as above detailed.

An example of the useful diester-based mixture wherein A is branched is RHODIASOLV® IRIS solvent, commercialized by Rhodia.

RHODIASOLV® IRIS solvent is a mixture of diesters comprising essentially (more than 80 wt %) of dimethyl ethylsuccinate and dimethyl 2-methylglutarate.

In one other embodiment, A in formulae ($I_{de}$) and ($I_{ea}$) is a linear divalent alkylene group of formula $(CH_2)_r$, wherein r is an integer of from 2 to 4.

In a variant of this embodiment, the mixture (M) comprises, in addition to DMSO:

(k) at least one of the diester ($III^4_{de}$), at least one diester ($III^3_{de}$), and at least one diester of formula ($III^2_{de}$); or (kk) at least one of the esteramide ($III^4_{ea}$), at least one esteramide ($III^3_{ea}$), and at least one esteramide of formula ($III^2_{ea}$); or (kkk) combinations of (k) and (kk), wherein:
($III^4_{de}$) is $R^1$—OOC—$(CH_2)_4$—COO—$R^2$
($III^3_{de}$) is $R^1$—OOC—$(CH_2)_3$—COO—$R^2$
($III^2_{de}$) is $R^1$—OOC—$(CH_2)_2$—COO—$R^2$
($III^4_{ea}$) is $R^1$—OOC—$(CH_2)_4$—CO—$NR^3R^4$
($III^3_{ea}$) is $R^1$—OOC—$(CH_2)_3$—CO—$NR^3R^4$
($III^2_{ea}$) is $R^1$—OOC—$(CH_2)_2$—CO—$NR^3R^4$ wherein $R^1$ and $R^2$, equal to or different from each other, are independently $C_1$-$C_{20}$ alkyl, $C_1$-$C_{20}$ aryl, $C_1$-$C_{20}$ alkyaryl, $C_1$-$C_{20}$ arylalkyl groups;

$R^3$ and $R^4$, equal to or different from each other, are selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituent, possibly having one or more than one heteroatom, and of cyclic moieties comprising both $R^3$ and $R^4$ and the nitrogen atom to which they are bound, said cyclic moieties possibly comprising one or more than one heteroatom, e.g. an oxygen atom or an additional nitrogen atom.

In above mentioned formulae ($III^4_{de}$), ($III^3_{de}$), ($III^2_{de}$), ($III^4_{ea}$), ($III^3_{ea}$), and ($III^2_{ea}$), $R^1$ and $R^2$ are preferably methyl groups, while $R^3$ and $R^4$, equal to or different from each other, are preferably selected from the group consisting of methyl, ethyl, hydroxyethyl.

According to certain preferred variant of this embodiment, mixture (M) can comprise, in addition to DMSO:

(I) a diester mixture consisting essentially of dimethyladipate (r=4), dimethylglutarate (r=3) and dimethylsuccinate (r=2); or (II) an esteramide mixture consisting essentially of $H_3COOC$—$(CH_2)_4$—CO—$N(CH_3)_2$, $H_3COOC$—$(CH_2)_3$—CO—$N(CH_3)_2$, and $H_3COOC$—$(CH_2)_2$—CO—$N(CH_3)_2$; or (III) a diester mixture of diethyladipate (r=4), diethylglutarate (r=3) and diethylsuccinate (r=2); or (Iv) an esteramide mixture consisting essentially of $H_5C_2OOC$—$(CH_2)_4$—CO—$N(CH_3)_2$, $H_5C_2OOC$—$(CH_2)_3$—CO—$N(CH_3)_2$, and $H_5C_2OOC$—$(CH_2)_2$—CO—$N(CH_3)_2$; or (v) a mixture of diisobutyladipate (r=4), diisobutylglutarate (r=3) and diisobutylsuccinate (r=2); or (vI) an esteramide mixture consisting essentially of $H_9C_4OOC$—$(CH_2)_4$—CO—$N(CH_3)_2$, $H_9C_4OOC$—$(CH_2)_3$—CO—$N(CH_3)_2$, and $H_9C_4OOC$—$(CH_2)_2$—CO—$N(CH_3)_2$; or (vII) mixtures thereof.

An exemplary embodiment of the variant listed above under section (I) is a diester mixture consisting essentially of:

from 9 to 17% by weight of dimethyladipate;
from 59 to 67% by weight of dimethylglutarate; and
from 20 to 28% by weight of dimethylsuccinate.

An example of a useful diester-based mixture wherein A is linear is RHODIASOLV® RPDE solvent, marketed by Rhodia.

RHODIASOLV® RPDE solvent is a mixture of diesters comprising essentially (more than 70 wt %) of dimethylglutarate and dimethylsuccinate.

Diesters of formula ($I_{de}$) which can be used in the composition of the invention can be prepared notably according to the teachings of EP 1991519 A (RHODIA OPERATIONS) 19 Nov. 2008. Esteramides of formula ($I_{ea}$) which can be used in the composition of the invention can be prepared notably according to the teachings of WO 2011/154661 (RHODIA OPERATIONS) 15 Dec. 2011 and US 20110166025 (RHODIA OPERATIONS) 7 Jul. 2011.

As said, mixture (M) comprises dimethylsulfoxide (DMSO) and at least one solvent selected from the group consisting of diesters of formula ($I_{de}$) and ester-amide of formula ($I_{ea}$).

The weight ratio between the solvents of formula ($I_{de}$) and ($I_{ea}$) and DMSO is preferably from 1/99 to 99/1, preferably of from 20/80 to 80/20, more preferably of 70/30 to 30/70.

The skilled in the art will select the appropriate weight ratio for opportunely tuning properties of the mixture (M) in the inventive composition.

The mixture (M) may comprise, in addition to the DMSO and the solvents of formula ($I_{de}$) and ($I_{ea}$), at least one further solvent.

If used, the amount of said further solvent is generally lower than both the amount of DMSO and of overall amount of the solvents of formula ($I_{de}$) and ($I_{ea}$). Still, the amount of said further solvent, when present, is preferably lower than 25% wt, preferably lower than 20% wt, more preferably lower than 15% wt, even more preferably lower than 10% wt, with respect to the total amount of DMSO and of solvents of formula ($I_{de}$) and ($I_{ea}$).

Exemplary embodiments of further solvents which may be used in the mixture (M) of the composition of the present invention include notably:

aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes;

aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane; monochlorobenzene, 1,2-dichlorobenzene, 1,3-dichlorobenzene, 1,4-dichlorobenzene, 1,2,4-trichlorobenzene or mixture of different chlorobenzenes;

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF);

glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether;

glycol ether esters such as ethylene glycol methyl ether acetate, ethylene glycol monoethyl ether acetate, ethylene glycol monobutyl ether acetate;

alcohols such as methyl alcohol, ethyl alcohol, diacetone alcohol;

ketones such as acetone, methylethylketone, methylisobutyl ketone, diisobutylketone, cyclohexanone, isophorone;

linear or cyclic esters such as: isopropyl acetate, n-butyl acetate, methyl acetoacetate, dimethyl phthalate, γ-butyrolactone;

linear or cyclic carboxamides such as N,N-dimethylacetamide (DMAC), N,N-diethylacetamide, dimethylformamide (DMF), diethylformamide or N-methyl-2-pyrrolidinone (NMP);

organic carbonates for example dimethyl carbonate, diethyl carbonate, dipropyl carbonate, dibutyl carbonate, ethylmethyl carbonate, ethylene carbonate, vinylene carbonate;

phosphoric esters such as trimethyl phosphate, triethyl phosphate;

ureas such as tetramethylurea, tetraethylurea.

For embodiments wherein the mixture (M) comprises a further solvent, mixture (M) is preferably free from solvents qualified as Carcinogenic, Mutagenic or Toxic to Reproduction according to chemical safety classification (CMR solvents); more specifically, the mixture (M) is advantageously substantially free from NMP, DMF and DMAC.

Nevertheless, mixtures (M) substantially free from any further solvent, i.e. consisting essentially of DMSO and of solvents of formula $(I_{de})$ and $(I_{ea})$ are those preferred.

Minor amount of impurities, solvent traces and residues might be present in the mixture (M) beside solvents of formula $(I_{de})$ and $(I_{ea})$ and DMSO, without these affecting the properties of the mixture (M). A total amount of said other components up to about 1% wt, based on the total weight of mixture (M) is generally tolerated.

In the rest of the text, the expressions "fluoropolymer" and "polymer (A)" are understood, for the purposes of the invention, both in the plural and the singular, that is to say that the inventive composition may comprise one or more than one polymer (A).

The amount of solvent (S) present in the fluoropolymer composition of the invention will be adjusted by one of ordinary skills in the art for ensuring obtaining a composition possessing the required properties (solubilisation capabilities, liquid viscosity, stability upon storage . . . ) needed for further processing. The fluoropolymer composition of the invention advantageously comprises solvent (S) in an amount of from 10 to 90% wt, preferably 15 to 85% wt, more preferably from 20 to 80% wt (extremes included), with respect to the total weight of the composition.

Preferably, the composition of the invention comprises only one polymer (A).

The polymer (A) is preferably a "melt-processible" polymer. For the purpose of the present invention, by the term "melt-processible" is meant that the polymer (A) can be processed (i.e. fabricated into shaped articles such as films, fibers, tubes, fittings, wire coatings and the like) by conventional melt extruding, injecting or casting means. This generally requires that the melt viscosity at the processing temperature be no more than $10^8$ Pa×sec, preferably from 10 to $10^6$ Pa×sec.

The melt viscosity of the polymer (A) can be measured according to ASTM D-1238, using a cylinder, orifice and piston tip made of a corrosion-resistant alloy, charging a sample into the 9.5 mm inside diameter cylinder which is maintained at a temperature exceeding melting point, extruding the sample through a 2.10 mm diameter, 8.00 mm long square-edged orifice under a load (piston plus weight) of 5 kg. Melt viscosity is calculated in Pa×sec from the observable extrusion rate in grams per minute.

Also, polymer (A) typically has a dynamic viscosity at a shear rate of 1 rad×sec$^{-1}$ and at a temperature exceeding melting point of about 30° C., preferably at a temperature of $T_{m2}+(30\pm2°$ C.) is comprised between 10 and $10^6$ Pa×sec, when measured with a controlled strain rheometer, employing an actuator to apply a deforming strain to the sample and a separate transducer to measure the resultant stress developed within the sample, and using the parallel plate fixture.

The polymer (A) of the invention is a fluoropolymer, i.e. a polymer comprising recurring units derived from at least one fluorinated monomer. Non limitative examples of suitable fluorinated monomers are notably:

$C_2$-$C_8$ perfluoroolefins, such as tetrafluoroethylene (TFE), hexafluoropropene (HFP);

$C_2$-$C_8$ hydrogen-containing fluoro-olefins, such as vinyl fluoride; 1,2-difluoroethylene, vinylidene fluoride (VDF) and trifluoroethylene (TrFE); pentafluoropropylene; and hexafluoroisobutylene;

(per)fluoroalkylethylenes complying with formula $CH_2$=CH—$R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2$=CFOR$_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2$=CFOR$_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2$=CFOX$_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2$=CFOCF$_2$OR$_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2$=CFOY$_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

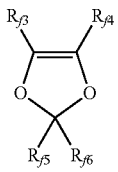

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Fluoropolymers which have been found particularly suitable for the compositions of the invention are per(halo)fluoropolymers; these materials are particularly advantageous when used in foamable compositions intended to be used for manufacturing foamed insulators (e.g. jackets or primaries for plenum cables, coaxial cables), due to their advantageous low flammability and outstanding dielectrical properties.

For the purpose of the invention, the term "per(halo)fluoropolymer" is intended to denote a fluoropolymer substantially free of hydrogen atoms.

The per(halo)fluoropolymer can comprise one or more halogen atoms (Cl, Br, I), different from fluorine.

The term "substantially free of hydrogen atom" is understood to mean that the per(halo)fluoropolymer consists essentially of recurring units derived from ethylenically unsaturated monomers comprising at least one fluorine atom and free of hydrogen atoms [per(halo)fluoromonomer (PFM)].

The per(halo)fluoropolymer can be a homopolymer of a per(halo)fluoromonomer (PFM) or a copolymer comprising recurring units derived from more than one per(halo)fluoromonomer (PFM).

Non limitative examples of suitable per(halo)fluoromonomers (PFM) are notably:

$C_2$-$C_8$ perfluoroolefins, such as tetrafluoroethylene (TFE) and hexafluoropropene (HFP);

$C_2$-$C_6$ perhalofluoroolefins comprising at least one halogen different from fluorine, e.g. Cl, Br, I; such as notably chlorotrifluoroethylene;

per(halo)fluoroalkylvinylethers complying with general formula $CF_2$=$CFOR_{f1}$ in which $R_{f1}$ is a $C_1$-$C_6$ per(halo)fluoroalkyl, possibly comprising one or more than one halogen atom different from F; non limitative examples of $R_{f1}$ are notably —$CF_3$, —$C_2F_5$, —$C_3F_7$;

per(halo)fluoro-oxyalkylvinylethers complying with general formula $CF_2$=$CFOX_{01}$, in which $X_{01}$ is a $C_1$-$C_{12}$ per(halo)fluorooxyalkyl possibly comprising halogen atoms different from F, having one or more ether groups, such as, notably, perfluoro-2-propoxy-propyl group;

per(halo)fluoro-methoxy-alkylvinylethers complying with general formula $CF_2$=$CFOCF_2OR_{f2}$ in which $R_{f2}$ is a $C_1$-$C_6$ per(halo)fluoroalkyl, possibly comprising halogen atoms different from F, such as —$CF_3$, —$C_2F_5$, —$C_3F_7$ or a $C_1$-$C_6$ per(halo)fluorooxyalkyl, possibly comprising halogen atoms different from F, having one or more ether groups, such as —$C_2F_5$—O—$CF_3$;

per(halo)fluorodioxoles of formula:

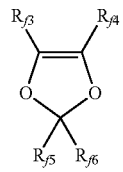

wherein each of $R_{f3}$, $R_{f4}$, $R_{f5}$, $R_{f6}$, equal of different each other, is independently a fluorine atom, a $C_1$-$C_6$ per(halo)fluoroalkyl group, optionally comprising one or more oxygen atom, possibly comprising halogen atoms different from F, e.g. —$CF_3$, —$C_2F_5$, —$C_3F_7$, —$OCF_3$, —$OCF_2CF_2OCF_3$; preferably a per(halo)fluorodioxole complying with formula here above, wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or a per(halo)fluorodioxole complying with formula here above, wherein $R_{f3}$, $R_{f5}$ and $R_{f6}$ are fluorine atoms and $R_{f4}$ is a perfluoromethoxy group (—$OCF_3$)

[2,2,4-trifluoro-5-trifluoromethoxy-1,3-dioxole or perfluoromethoxydioxole (MDO)].

The per(halo)fluoropolymer is advantageously chosen among copolymers of tetrafluoroethylene (TFE) with at least one per(halo)fluoromonomer (PFM) different from TFE.

The TFE copolymers as above detailed comprise advantageously at least 0.6% wt, preferably at least 0.7% wt, more preferably at least 0.8% wt of recurring units derived from the per(halo)fluoromonomer (PFM).

The TFE copolymers as above detailed comprise advantageously at most 35% wt, preferably at most 30% wt, more preferably 25% wt of recurring units derived from the per(halo)fluoromonomer (PFM).

Good results have been obtained with TFE copolymers as above detailed comprising at least 0.8% wt and at most 30% wt of recurring units derived from the per(halo)fluoromonomer (PFM).

Preferred per(halo)fluoropolymers [polymers (A)] are selected among TFE copolymers comprising recurring units derived from at least one per(halo)fluoromonomer (PFM) chosen among the group consisting of:

1. perfluoroalkylvinylethers complying with formula $CF_2$=$CFOR_{f1'}$, in which $R_{f1'}$ is a $C_1$-$C_6$ perfluoroalkyl, e.g. —$CF_3$, —$C_2F_5$, —$C_3F_7$; and/or
2. perfluoro-oxyalkylvinylethers complying with general formula $CF_2$=$CFOX_0$, in which $X_0$ is a $C_1$-$C_{12}$ perfluorooxyalkyl having one or more ether groups, like perfluoro-2-propoxy-propyl group; and/or
3. $C_3$-$C_8$ perfluoroolefins, such as hexafluoropropene (HFP); and/or
4. perfluorodioxoles of formula:

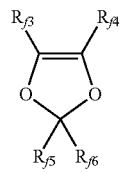

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$.

More preferred per(halo)fluoropolymers are selected among TFE copolymers comprising recurring units derived from at least one per(halo)fluoromonomer (PFM) chosen among the group consisting of:
1. perfluoroalkylvinylethers complying with general formula $CF_2=CFOR_{f1}$ in which $R_{f1}$ is a $C_1$-$C_6$ perfluoroalkyl;
2. perfluoro-oxyalkylvinylethers complying with general formula $CF_2=CFOX_{01}$, in which $X_{01}$ is a $C_1$-$C_{12}$ perfluorooxyalkyl having one or more ether groups;
3. $C_3$-$C_8$ perfluoroolefins; and
4. mixtures thereof.

According to a first embodiment of the invention, the polymer (A) is selected from the group consisting of TFE copolymers comprising recurring units derived from hexafluoropropylene (HFP) and optionally from at least one per(halo)fluoroalkylvinylether, as above defined, preferably from at least one perfluoroalkylvinylether complying with general formula $CF_2=CFOR_{f1'}$ in which $R_{f1'}$ is a $C_1$-$C_6$ perfluoroalkyl.

Preferred polymers (A) according to this embodiment are selected among TFE copolymers comprising (preferably consisting essentially of) recurring units derived from tetrafluoroethylene (TFE) and hexafluoropropylene (HFP) in an amount ranging from 3 to 15 wt % and, optionally, from 0.5 to 3 wt % of at least one perfluoroalkylvinylether, as above defined.

The expression 'consisting essentially of' is used within the context of the present invention for defining constituents of a polymer to take into account end chains, defects, irregularities and monomer rearrangements which might be comprised in said polymers in minor amounts, without this modifying essential properties of the polymer.

A description of such polymers (A) can be found notably in U.S. Pat. No. 4,029,868 (DUPONT) 14 Jun. 1977, in U.S. Pat. No. 5,677,404 (DUPONT) 14 Oct. 1997, in U.S. Pat. No. 5,703,185 (DUPONT) 30 Dec. 1997, and in U.S. Pat. No. 5,688,885 (DUPONT) 18 Nov. 1997.

Polymer (A) according to this embodiment are commercially available under the trademark TEFLON® FEP 9494, 6100 and 5100 from E.I. DuPont de Nemours, or from Daikin (e.g. FEP NP-101 material), or from Dyneon LLC (FEP 6322).

Best results within this embodiment have been obtained with TFE copolymers comprising (preferably consisting essentially of) recurring units derived from tetrafluoroethylene (TFE) and hexafluoropropylene (HFP) in an amount ranging from 4 to 12 wt % and either perfluoro(ethyl vinyl ether) or perfluoro(propyl vinyl ether) in an amount from 0.5 to 3% wt.

According to a second embodiment of the invention, the polymer (A) is selected from the group consisting of TFE copolymers comprising recurring units derived from at least one per(halo)fluoroalkylvinylether, as above defined, preferably from at least one perfluoroalkylvinylether, as above defined and optionally further comprising recurring units derived from at least one $C_3$-$C_8$ perfluoroolefin.

Good results within this second embodiment have been obtained with TFE copolymers comprising recurring units derived from one or more than one perfluoroalkylvinylether as above specified; particularly good results have been achieved with TFE copolymers wherein the perfluoroalkylvinylether is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

According to a preferred variant of the second embodiment of the invention, the polymer (A) is advantageously a TFE copolymer consisting essentially of:
(a) from 3 to 35%, preferably from 5 to 12% by weight of recurring units derived from perfluoromethylvinylether;
(b) from 0 to 6% by weight of recurring units derived from one or more than one fluorinated comonomer different from perfluoromethylvinylether and selected from the group consisting of perfluoroalkylvinylethers complying with general formula $CF_2=CFOR_{f1'}$ in which $R_{f1'}$ is a $C_1$-$C_6$ perfluoroalkyl and perfluoro-oxyalkylvinylethers complying with general formula $CF_2=CFOX_{01'}$, in which $X_{01'}$ is a $C_1$-$C_{12}$ perfluorooxyalkyl having one or more ether groups; preferably derived from perfluoroethylvinylether and/or perfluoropropylvinylether;
(c) recurring units derived from tetrafluoroethylene, in such an amount that the sum of the percentages of the recurring units (a), (b) and (c) is equal to 100% by weight.

MFA and PFA suitable to be used for the composition of the invention are commercially available from Solvay Specialty Polymers Italy S.p.A. under the trade name of HYFLON® PFA P and M series and HYFLON® MFA.

According to another preferred variant of this second embodiment of the invention, the polymer (A) is advantageously a TFE copolymer consisting essentially of:
(a) from 0.5 to 5% by weight of recurring units derived from perfluoromethylvinylether;
(b) from 0.4 to 4.5% by weight of recurring units derived from one or more than one fluorinated comonomer different from perfluoromethylvinylether and selected from the group consisting of perfluoroalkylvinylethers, as above detailed and/or perfluoro-oxyalkylvinylethers, as above detailed; preferably derived from perfluoroethylvinylether and/or perfluoropropylvinylether;
(c) from 0.5 to 6% weight of recurring units derived from at least one $C_3$-$C_8$ perfluoroolefins, preferably derived from hexafluoropropylene; and
(d) recurring units derived from tetrafluoroethylene, in such an amount that the sum of the percentages of the recurring units (a), (b), (c) and (d) is equal to 100% by weight.

The polymer (A) of the invention is advantageously thermoplastic.

The term "thermoplastic" is understood to mean, for the purposes of the present invention, polymers existing, at room temperature (25° C.), below their melting point if they are semi-crystalline, or below their $T_g$ if amorphous. These polymers have the property of becoming soft when they are heated and of becoming rigid again when they are cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

Preferably, the polymer (A) is semi-crystalline. The term "semi-crystalline" is intended to denote a polymer having a heat of fusion of more than 1 J/g when measured by Differential canning calorimetry (DSC) at a heating rate of 10° C./min, according to ASTM D 3418. Preferably, the semi-crystalline polymer (A) of the invention has a heat of fusion of at least 3 J/g, more preferably of at least 5 J/g, most preferably at least 10 J/g.

Suitable polymers (A) may have a completely amorphous structure, a partially or completely crystalline structure, or anything in between. Upon heating, these suitable thermoplastic polymers can melt, becoming sufficiently free flowing to permit processing using standard techniques (molding, extrusion, etc.). In certain embodiments, both amorphous and at least partially crystalline polymers (A) may be used.

The fluoropolymer composition of the invention advantageously comprises polymer (A) in an amount of from 1 to 25% wt, preferably 2 to 20% wt, more preferably from 3 to 15% wt (extremes included), with respect to the total weight of the composition.

Generally, polymer (A) and compound (B) are used in the fluoropolymer composition of the invention in an amount such that the weight ratio polymer (A)/compound (B) is comprised between 2:1 to 1:2.

To the purpose of the present invention, "aromatic polyimide" and "polymer (PI)" is intended to denote any polymer comprising recurring units, more than 50% moles of said recurring units comprising at least one aromatic ring and at least one imide group, as such (formula 1A) or in its amic acid form (formula 1B) [recurring units ($R_{PI}$)]:

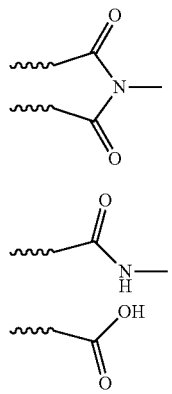

formula 1A formula 1B

The imide group, as such or in its corresponding amic acid form, is advantageously linked to an aromatic ring, as illustrated below:

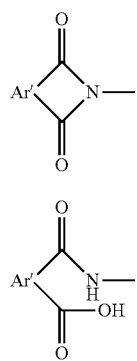

formula 2A formula 2B whereas Ar' denotes a moiety containing at least one aromatic ring.

The imide group is advantageously present as condensed aromatic system, yielding a five- or six-membered heteroaromatic ring, such as, for instance, with benzene (phthalimide-type structure, formula 3) and naphthalene (naphthalimide-type structure, formula 4).

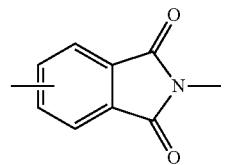

formula 3

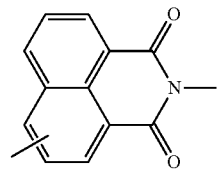

formula 4

The formulae here below depict examples of recurring units ($R_{PI}$) (formulae 5A to 5C):

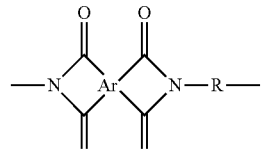

formula 5A

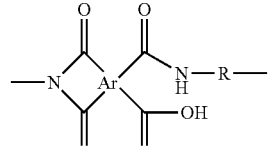

formula 5B

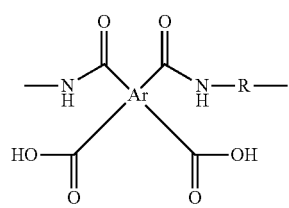

formula 5C wherein:

Ar represents an aromatic tetravalent group; typically Ar is selected from the group consisting of following structures:

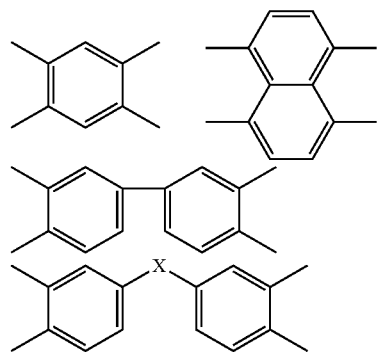

and corresponding optionally substituted structures, with X being —O—, —C(O)—, —CH$_2$—, —C(CF$_3$)$_2$—, —(CF$_2$)$_n$—, with n being an integer from 1 to 5;

R represents an aromatic divalent group; typically R is selected from the group consisting of following structures:

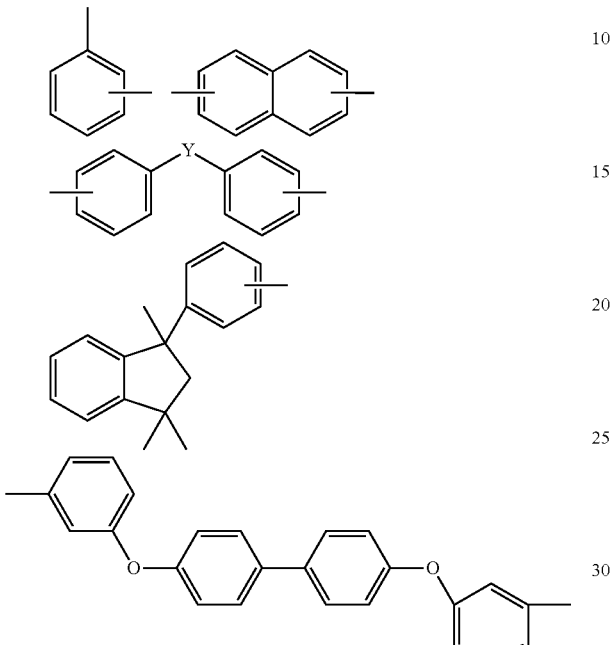

and corresponding optionally substituted structures, with Y being a covalent bond, —O—, —S—, —SO$_2$—, —(CH$_2$)$_m$, with m being an integer from 1 to 6, —C(O)—, —C(CF$_3$)$_2$—, —(CF$_2$)$_n$—, n being an integer from 1 to 6.

Polyimides commercialized by DuPont as VESPEL® polyimides or by Mitsui as AURUM® polyimides are suitable for the purpose of the invention.

The recurring units (R$_{PI}$) of the aromatic polyimide can comprise one or more functional groups other than the imide group, as such and/or in its amic acid form. Non limitative examples of polymers complying with this criterion are aromatic polyetherimides (PEI), aromatic polyesterimides and aromatic polyamide-imides (PAI).

To the purpose of the present invention, "aromatic polyesterimide" is intended to denote any polymer more than 50% moles of the recurring units comprise at least one aromatic ring, at least one imide group, as such and/or in its amic acid form, and at least one ester group [recurring units (R$_{PEI}$)]. Typically, aromatic polyesterimides are made by reacting at least one acid monomer chosen from trimellitic anhydride and trimellitic anhydride monoacid halides with at least one diol, followed by reaction with at least one diamine.

To the purpose of the present invention, "aromatic polyamide-imide (PAI)" is intended to denote any polymer comprising more than 50% moles of recurring units comprising at least one aromatic ring, at least one imide group, as such and/or in its amic acid form, and at least one amide group which is not included in the amic acid form of an imide group [recurring units (R$_{PAI}$)].

The recurring units (R$_{PAI}$) are advantageously chosen among:

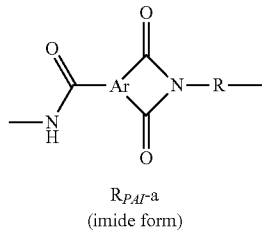

R$_{PAI}$-a
(imide form)

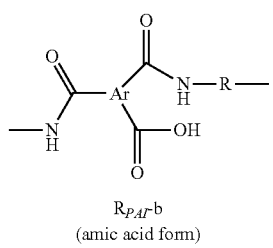

R$_{PAI}$-b
(amic acid form)

wherein:

Ar is a trivalent aromatic group; typically Ar is selected from the group consisting of following structures:

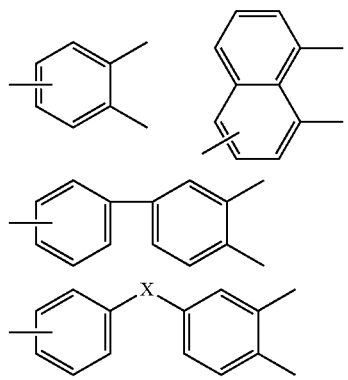

and corresponding optionally substituted structures, with X being —O—, —C(O)—, —CH$_2$—, —C(CF$_3$)$_2$—, —(CF$_2$)$_n$—, with n being an integer from 1 to 5;

R is a divalent aromatic group; typically R is selected from the group consisting of following structures:

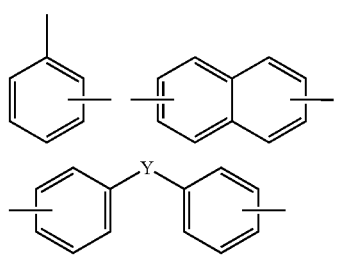

-continued

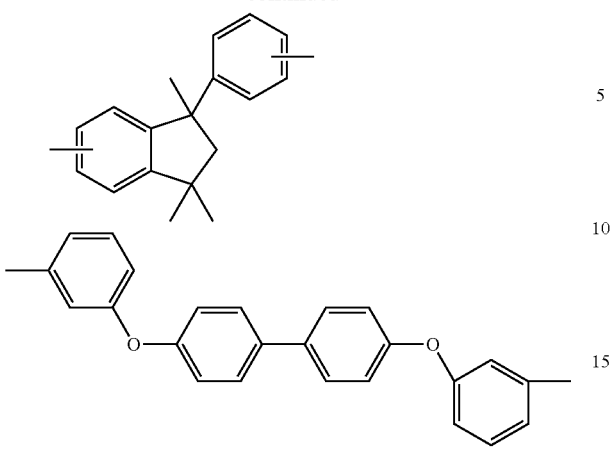

and corresponding optionally substituted structures, with Y being —O—, —S—, —SO$_2$—, —CH$_2$—, —C(O)—, —C(CF$_3$)$_2$—, —(CF$_2$)$_n$, n being an integer from 0 to 5.

Preferably, the aromatic polyamide-imide comprises more than 50% of recurring units (R$_{PAI}$) comprising an imide group in which the imide group is present as such, like in recurring units (R$_{PAI}$-a), and/or in its amic acid form, like in recurring units (R$_{PAI}$-b).

Recurring units (R$_{PAI}$) are preferably chosen from recurring units (I), (m) and (n), in their amide-imide (a) or amide-amic acid (b) forms: (I)

l-a

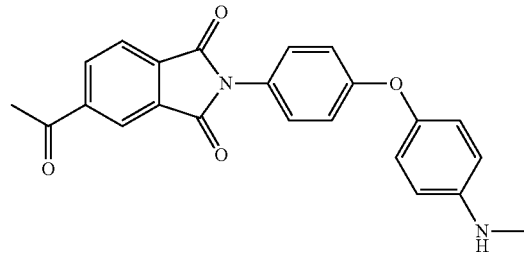

(amide-imide form)

l-b

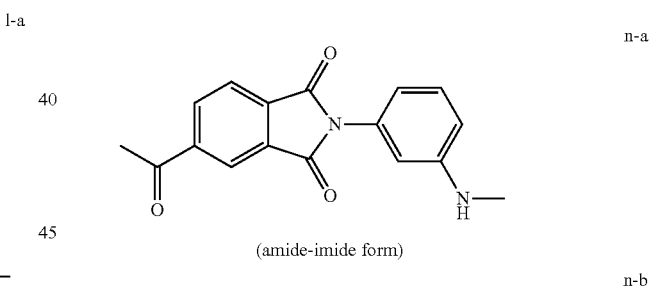

(amide-amic acid form)

wherein the attachment of the two amide groups to the aromatic ring as shown in (I-b) will be understood to represent the 1,3 and the 1,4 polyamide-amic acid configurations;

(m)

m-a

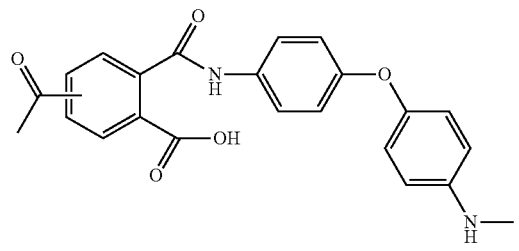

(amide-imide form)

m-b (amide-amic acid form)

wherein the attachment of the two amide groups to the aromatic ring as shown in (m-b) will be understood to represent the 1,3 and the 1,4 polyamide-amic acid configurations; and (n)

n-a

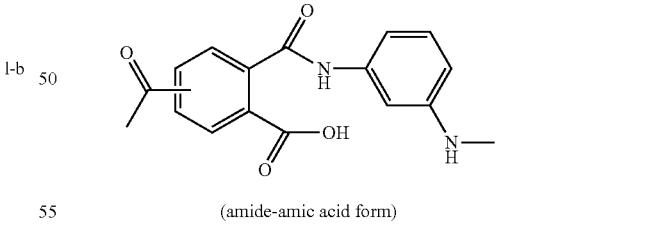

(amide-imide form)

n-b (amide-amic acid form)

wherein the attachment of the two amide groups to the aromatic ring as shown in (n-b) will be understood to represent the 1,3 and the 1,4 polyamide-amic acid configurations.

Very preferably, the aromatic polyamide-imide comprises more than 90% moles of recurring units (R$_{PAI}$). Still more preferably, it contains no recurring unit other than recurring units (R$_{PAI}$). Polymers commercialized by Solvay Specialty Polymers USA, L.L.C., as TORLON® polyamide-imides comply with this criterion.

The fluoropolymer composition of the invention advantageously comprises polymer (PI) in an amount of from 0.1 to 6% wt, preferably 0.5 to 6% wt, more preferably from 1 to 4% wt (extremes included), with respect to the total weight of the composition.

The composition of the invention may additionally comprise at least one aromatic polycondensation polymer [polymer (P)] different from the aromatic polyimide (PI). Polymers (P) suitable for use in the present invention are preferably selected from the group consisting of aromatic sulfone polymers (SP).

For the purpose of the invention, the expression "aromatic sulfone polymer (SP)" is intended to denote any polymer, at least 50% moles of the recurring units thereof comprise at least one group of formula (SP) [recurring units ($R_{SP}$)]:

  formula (SP)

with Ar and Ar', equal to or different from each other, being aromatic groups. Recurring units ($R_{SP}$) generally comply with formula:

and preferably T is selected from the group consisting of a bond, —$CH_2$—, —C(O)—, —C($CH_3$)$_2$—, —C($CF_3$)$_2$—, —C(=$CCl_2$)—, —C($CH_3$)($CH_2CH_2COOH$)—, and a group of formula:

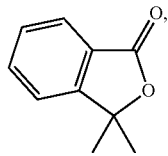

and n and m, equal to or different from each other, are independently zero or an integer of 1 to 5.

Recurring units ($R_{SP}$) can be notably selected from the group consisting of those of formulae (S-A) to (S-D) herein below:

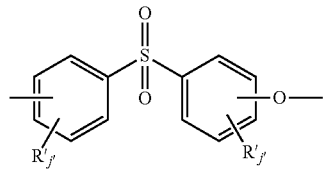 (S-A)

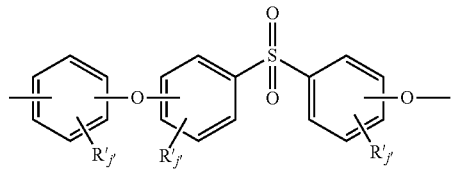 (S-B)

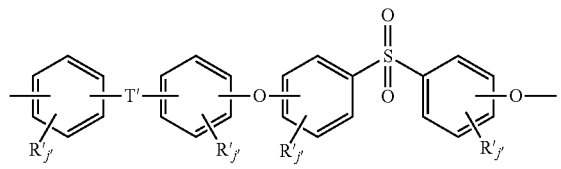 (S-C)

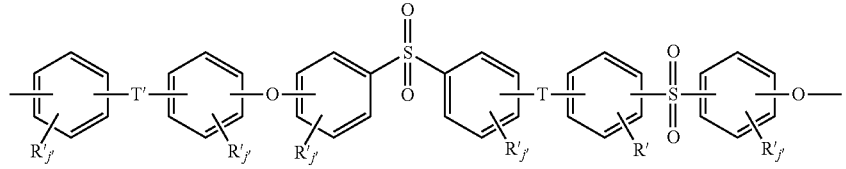 (S-D)

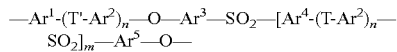

wherein:
$Ar^1$, $Ar^2$, $Ar^3$, $Ar^4$, and $Ar^5$, equal to or different from each other and at each occurrence, are independently a aromatic mono- or polynuclear group;

T and T', equal to or different from each other and at each occurrence, is independently a bond or a divalent group optionally comprising one or more than one heteroatom; preferably T' is selected from the group consisting of a bond, —$CH_2$—, —C(O)—, —C($CH_3$)$_2$—, —C($CF_3$)$_2$—, —C(=$CCl_2$)—, —$SO_2$—, —C($CH_3$)($CH_2CH_2COOH$)—, and a group of formula:

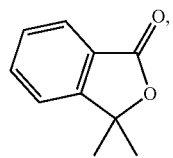

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other are a bond or a divalent group optionally comprising one or more than one heteroatom; preferably T' is selected from the group consisting of a bond, —$CH_2$—, —C(O)—, —C($CH_3$)$_2$—, —C($CF_3$)$_2$—, —C(=$CCl_2$)—, —C($CH_3$)($CH_2CH_2COOH$)—, —$SO_2$—, and a group of formula:

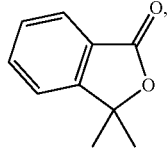

and preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

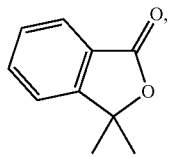

and

The aromatic sulfone polymer (P) has typically a glass transition temperature of advantageously at least 150° C., preferably at least 160° C., more preferably at least 175° C.

In a first preferred embodiment of the invention, at least 50% moles of the recurring units of aromatic sulfone polymer (SP) are recurring units (R$_{SP-1}$), in their imide form (R$_{SP-1}$-A) and/or amic acid forms [(R$_{SP-1}$-B) and (R$_{SP-1}$-C)]:

(R$_{SP-1}$-A)

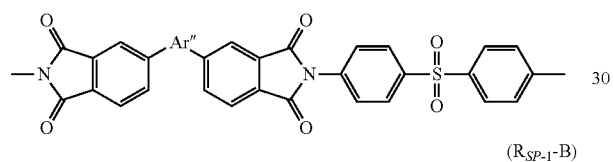

(R$_{SP-1}$-B)

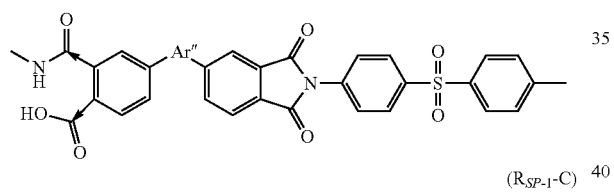

(R$_{SP-1}$-C)

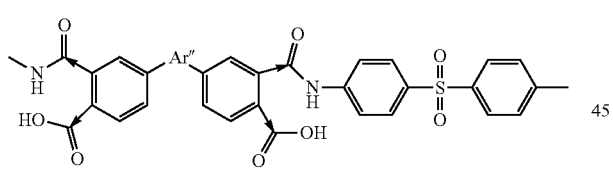

wherein:
the → denotes isomerism so that in any recurring unit the groups to which the arrows point may exist as shown or in an interchanged position;
Ar″ is selected from the group consisting of:

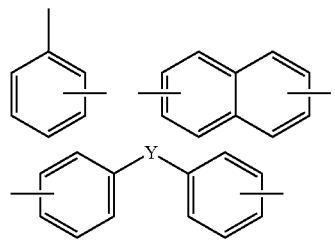

and corresponding optionally substituted structures, with Y being —O—, —C(O)—, —(CH$_2$)$_n$—, —C(CF$_3$)$_2$—, —(CF$_2$)$_n$—, with n being an integer from 1 to 5, and mixtures thereof.

In a second preferred embodiment of the invention, at least 50% moles of the recurring units of aromatic sulfone polymer (SP) are recurring units (R$_{SP-2}$) and/or recurring units (R$_{SP-3}$)

(R$_{SP-2}$)

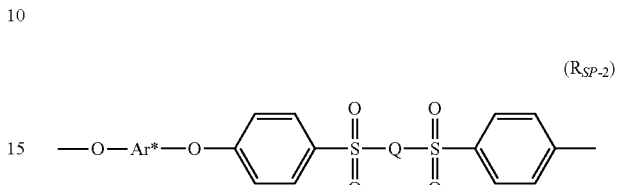

(R$_{SP-3}$)

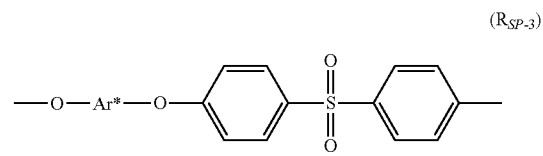

wherein:

Q and Ar*, equal or different from each other and at each occurrence, are independently a divalent aromatic group; preferably Ar* and Q equal or different from each other and at each occurrence, are independently selected from the group consisting of the following structures:

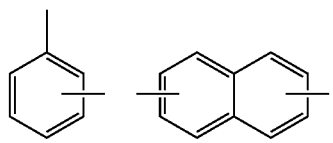

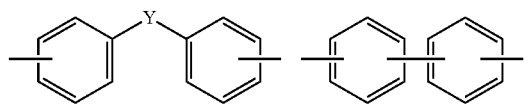

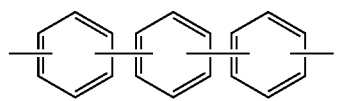

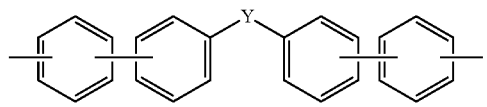

and corresponding optionally substituted structures, with Y being —O—, —CH=CH—, —C≡C—, —S—, —C(O)—, —(CH$_2$)$_n$—, —C(CF$_3$)$_2$—, —C(CH$_3$)$_2$—, —SO$_2$—, —(CF$_2$)$_n$—, with n being an integer from 1 to 5 and mixtures thereof; and mixtures thereof.

Recurring units ($R_{SP-2}$) are preferably selected from the group consisting of:

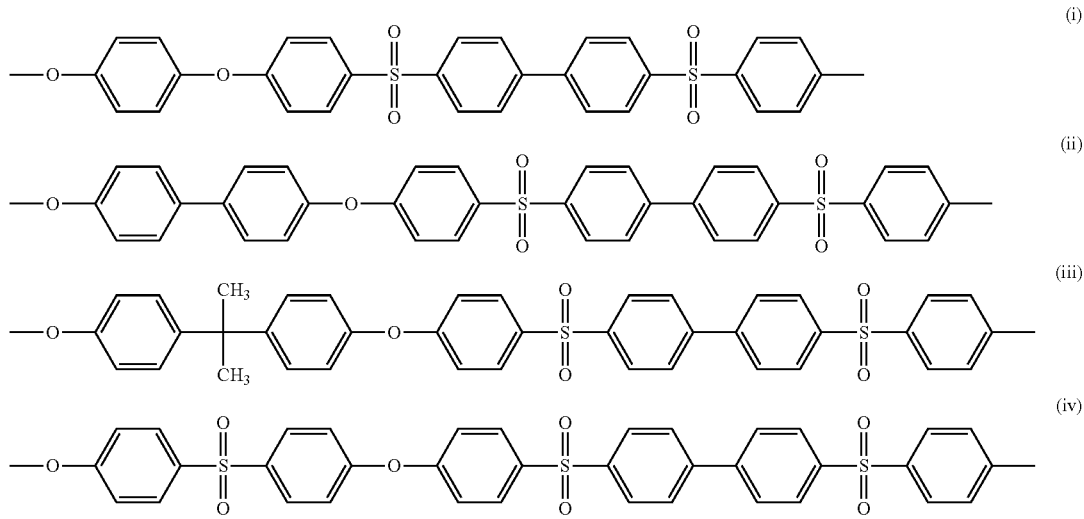

and mixtures thereof.

Recurring units ($R_{SP-3}$) are preferably selected from the group consisting of:

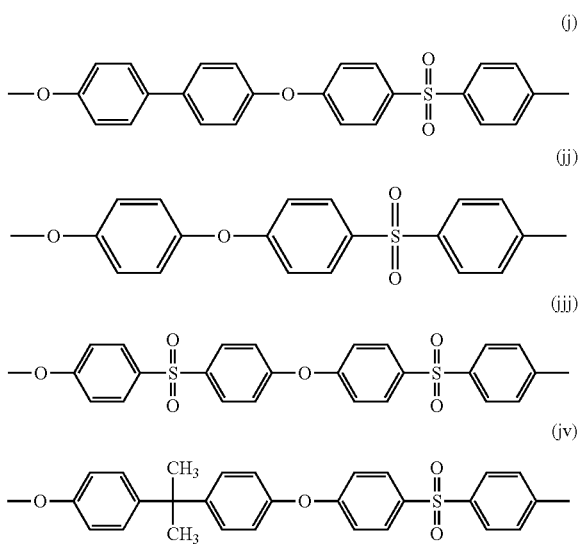

and mixtures thereof.

Aromatic sulfone polymer (SP) according to the second preferred embodiment of the invention comprises at least 50% moles, preferably 70% moles, more preferably 75% moles of recurring units ($R_{SP-2}$) and/or ($R_{SP-3}$), still more preferably, it contains no recurring unit other than recurring units ($R_{SP-2}$) and/or ($R_{SP-3}$).

Good results were obtained with aromatic sulfone polymer (SP) the recurring units of which are recurring units (ii) (polybiphenyldisulfone, herein after), with aromatic sulfone polymer (SP) the recurring units of which are recurring units (j) (polyphenylsulfone or PPSU, hereinafter), with aromatic sulfone polymer (SP) the recurring units of which are recurring units (jj) (polyetherethersulfone, hereinafter), with aromatic sulfone polymer (SP) the recurring units of which are recurring units (jjj) and, optionally in addition, recurring units (jjj) (polyethersulfone or PES, hereinafter), and with aromatic sulfone polymer (SP) the recurring units of which are recurring units (jv) and, optionally in addition, recurring units (jj) (polysulfone, or PSF hereinafter).

Polyphenylsulfone (PPSU) is notably available as RADEL® R PPSU from Solvay Specialty Polymers USA, L.L.C. Polysulfone (PSF) is notably available as UDEL® PSF fromSolvay Specialty Polymers USA, L.L.C. Polyethersulfone (PES) is notably available as RADEL® A PES or as VIRANTAGE® r-PES from Solvay Specialty Polymers USA, L.L.C.

Very good results have been obtained with polyethersulfone (PES), i.e. with aromatic sulfone polymer (SP) the recurring units of which are recurring units (jjj) and, optionally in addition, recurring units (jj).

A PES which has been found particularly adapted to the composition of the present invention is a polyethersulfone (PES), as above detailed, having hydroxyl end groups in an amount of at least 20 μeq/g, preferably 40 μeq/g, more preferably 50 μeq/g. A PES of this type is notably commercially available as VIRANTAGE® r-PESU from Solvay Specialty Polymers USA, L.L.C.

According to certain embodiments, the composition of the invention comprises a mixture of at least one polyamideimide (PAI) and at least one aromatic sulfone polymer (SP), even more preferably a mixture of at least one polyamideimide (PAI) and at least one polyethersulfone (PES), as above detailed.

The composition can additionally comprise at least one pigment; pigments useful in the composition of the invention notably include, or will comprise, one or more of the following: titanium dioxide which is notably available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepherd Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Engelhard Industries, Edison, N.J. USA.

Still, the composition can comprise at least one of the following:

- an inorganic filler, preferably selected from mica fillers, more preferably from mica fillers coated with metal oxides; fillers of this type are notably available under brad name IRIODIN® from Merk;
- a rheology modifier, preferably selected from modified polyamides, modified urea; polyethylene waxes, organic derivatives of bentonite clays;
- a defoaming agent, preferably selected from polydimethyl siloxanes, in particular modified polydimethyl siloxanes, fluorinated silicones; and
- a surfactant, preferably selected from alkyl ethoxylated alcohols, alkylphenol ethoxylated alcohols.

Another aspect of the present invention is thus a process for manufacturing the composition as above detailed.

The composition of the invention can be prepared by mixing the polymer (A), the polymer (B), the polymer (PI), the solvent (S) and, when present, all other additional ingredients.

The composition, as above detailed, is generally used for coating a surface. Still another aspect of the invention thus pertains to a method for coating a surface, including a step of coating the composition, as above detailed, onto said surface, so as to obtain a wet coating layer onto said surface.

The surface is generally a metal surface, including notably aluminium, copper, tin, zinc, iron, and alloys thereof, including steel, and stainless steel.

Coating can be achieved by means of any coating method, including notably spray coating, spin-coating, brush-coating, and the like.

The method of coating can comprise a subsequent step of drying said wet coating layer, so as to obtain a dried coating layer onto said surface.

Drying can be carried out at temperatures ranging from room temperature to about 200° C., and is intended advantageously to remove all volatile materials contained in the composition.

The dried coating layer or the wet coating layer can be further coated with at least one additional layer of polymer, preferably of a fluoropolymer, so as to provide one or more than one outer fluoropolymer layer assembled onto the dried or wet coating layer onto the surface. The fluoropolymer used for this coating step is generally selected from polymers (A) as above described. Said one or more than one outer coating layer of polymer (A) can be notably applied onto the said dried or wet coating layer by powder coating, spray coating or any other coating technique.

Typical thicknesses of multi-layer assemblies including a layer made from the inventive composition and one or more than one additional layer, as above detailed, range from about 50 μm to about 1000 μm, being understood that to reach thicknesses of up to 1000 μm, several additional fluoropolymer layers may be required.

A subsequent sintering step generally follows, comprising heating at temperatures of from 300 to 400° C. the multi-layer assembly including the surface, the dried coating layer and the outer fluoropolymer layer.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

General Procedure for the Manufacture of the Composition

The solvent mixture (M) comprising DMSO and at least one of the diesters of formula ($I_{de}$) and ester-amide of formula ($I_{ea}$) is prepared by blending and shaking the ingredients in a bottle at a temperature comprised between 20 and 35° C.

The compound (B) and the polymer (PI) were added at room temperature and solubilised in the solvent mixture through agitation on a bottle roller at a temperature comprised between 20° C. and 90° C. Once complete dissolution of said polymer(s) was achieved, the fluoropolymer (A) was added to the resulting transparent solution, and the bottle is agitated on a bottle roller for additional 10 minutes. Following similar procedure (addition, followed by 10 minutes blending), the other ingredients were added in the following order:

- pigment;
- optional further solvent;
- surfactant;
- defoamer/deareator;
- optional rheology modifier.

The resulting mixture was finally homogeneized and milled in a glass beads blender, by adding an amount of glass beads equal to the volume of the obtained mixture, and blending the resulting dispersion in a Dispermat CV3 mixer for 10 minutes. Appropriate homogeneization was checked by evaluation on grind gauge grooves so as to detect, if any, presence of aggregates/particles with dimension higher than 5 μm. In case any particle(s)/aggregate(s) of dimension higher than 5 μm was/were detected, additional grinding for 10 minutes was performed. Formulation was considered completed and well-dispersed only when after the composition was distributed with a scraper in the grooves of the grind gauge, no detected scratches or film discontinuities above 5 μm were detected.

General Coating Procedure

The formulation prepared as above detailed was applied on carbon steel substrates (square panels) via spray coating using a gun with a die of 1.2 mm and air pressure of 2.5 bar.

On the wet primer a layer of HYFLON® PFA powder (a tetrafluoroethylene/perfluoropropylvinylether copolymer commercially available from Solvay Specialty Polymers Italy, SPA) has been applied as top coat via electrostatic powder coating and then the assembly is treated in oven at 380° C. for 20 minutes. The thickness of the complete coating (primer+top coat) was comprised between 50 and 150 μm.

Evaluation of adhesion properties (including initial adhesion and after 60 days of water vapour exposure)

Adhesion performances of the coatings onto the substrate were determined via the cross cut test. The coating was cut making two incision lines of about 20 mm crossing each other in the middle with an angle of about 60°. The coating in proximity of the cross point was scratched: if a continuous polymer film was detached from the substrate, the adhesion was qualified as poor. If, on the contrary, it was not possible to peel the coating, the adhesion was quoted as good.

This test for assessing adhesion was performed on at least 3 coated panels shortly after completion of the coating procedure (about 1 hour) and on at least additional 3 coated panels, after having exposed the same to water vapour for 60 days. To this aim, the coated side of the panels to be submitted to the test was contacted with water vapour generated by a water bath maintained at 85° C., suspending horizontally the panels at about 3 cm from the free surface of hot water.

Details of the compositions manufactured and obtained results are provided in the following table.

In this table:
- the ester-amide (EA) is an ester-amide of formula MeO—C(O)—CH(Me)-CH$_2$CH$_2$C(O)—NMe$_2$ with Me=methyl, commercially available from Rhodia under trade name POLAR CLEAN®;
- the diester (DE) is a mixture of diesters comprising essentially (more than 80 wt %) of dimethyl ethylsuccinate and dimethyl 2-methylglutarate, commercially available from Rhodia under trade name RHODIASOLV® IRIS;
- MFA P6010 stands for HYFLON® MFA P6010, which is a TFE/MVE copolymer commercially available from Solvay Specialty Polymers Italy SpA;
- VW10200 stands for Virantage® VW10200RP PES, which is a hydroxyl-functionalized PES with a molecular weight of about 45000, commercially available from Solvay Specialty Polymers USA, LLC;
- PAI AI10 stands for Torlon® PAI A110, which is a polyamideimide commercially available from Solvay Specialty Polymers USA, LLC;
- MT 35600 stands for ARALDITE® benzoxazine resin MT 35600, obtained by reaction of aniline, formaldehyde and bis-phenol A, commercially available from Huntsman;
- 30C 965 Shepherd is a black pigment commercially available as DYNAMIX™ BLACK 30C965 from Shepherd Color Company;
- BYK®-431 is a Liquid Rheology Control Additive made consisting of a solution of a high molecular urea modified medium polar polyamide, commercially available from BYK;
- Airex 931 stands for TEGO® Airex 931, which is a deaerator/defoaming agent for solvent-based coating systems, based on a fluorinated silicone commercially available from Evonik Tego Chemie GmbH;
- 15-S-5 stands for Tergitol™ 15-S-5, which is a secondary Alcohol Ethoxylate surfactant commercially available from Dow.

TABLE 1

| Material | RUN | 1C | 2C | 3 | 4C |
|---|---|---|---|---|---|
|  | Ester-amide (EA) | 35.3 |  | 35 | 34.1 |
|  | Diester (DE) |  | 35.3 |  |  |
|  | Ethyl Acetate | 1.4 | 1.4 | 1.4 | 1.4 |
|  | DMSO | 35.3 | 35.3 | 35 | 34.1 |
| Polymer (P) | VW10200 | 6.6 | 6.6 | — | — |
| Polymer (PI) | PAI AI10 | 2 | 2 | 1.7 | — |
| Compound (B) | MT 35600 | — | — | 6.6 | 8.2 |
| Polymer (A) | MFA P6010 | 9.4 | 9.4 | 9.1 | 9.0 |
| Pigment | 30C 965 | 7 | 7 | 6.5 | 6.9 |
| Rheology modifier | BYK ®-431 | 0.5 | 0.5 | 1.3 | 1.5 |
| Defoamer | Airex 931 | 0.2 | 0.2 | 0.2 | 1.0 |
| Surfactant | 15-S-5 | 2.3 | 2.3 | 3.2 | 3.4 |
| Cross cut test | | | | | |
| Initial adhesion |  | good | good | good | good |
| Adhesion after 3 days vapour exposure |  | n.d. | n.d. | n.d. | fail |
| Adhesion after 60 days vapour exposure |  | good | good | good | — |
| Adhesion after 240 days vapour exposure |  | fail | fail | good | — |

Data provided herein above well demonstrate that combination of compound (B) and aromatic polyimide polymer can be successfully used for manufacturing fluoropolymer primer compositions providing outstanding adhesion behaviour, even in harsh conditions for prolonged exposure to water vapors, wherein other primers deprived of compound (B) fail.

The invention claimed is:

1. A fluoropolymer composition comprising:
   at least one fluoropolymer [polymer (A)];
   at least one benzoxazine compound [compound (B)] of formula (I):

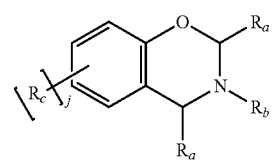

Formula (I)

wherein each of $R_a$, equal to or different at each occurrence, is H or a $C_1$-$C_{12}$ alkyl group;
$R_b$ is a $C_1$-$C_{36}$ hydrocarbon group, optionally comprising heteroatoms, optionally comprising at least one benzoxazine group; j is zero or an integer of 1 to 4;
and each of $R_c$, equal or different at each occurrence, is a halogen or a $C_1$-$C_{36}$ hydrocarbon group, optionally comprising heteroatoms, optionally comprising at least one benzoxazine group;
at least one aromatic polyimide polymer [polymer (PI)]; and
an organic solvent [solvent (S)].

2. The fluoropolymer composition of claim 1, wherein solvent (S) is a solvent mixture [mixture (M)] comprising dimethylsulfoxide (DMSO) and at least one solvent selected from the group consisting of diesters of formula ($I_{de}$) and ester-amide of formula ($I_{ea}$):

wherein:
$R^1$ and $R^2$, equal to or different from each other, are independently selected from the group consisting of $C_1$-$C_{20}$ hydrocarbon groups;
$R^3$ and $R^4$, equal to or different from each other, are independently selected from the group consisting of hydrogen, $C_1$-$C_{36}$ hydrocarbon groups, optionally substituted, wherein $R^3$ and $R^4$ optionally form a cyclic moiety including the nitrogen atom to which they are bound, said cyclic moiety being optionally substituted and/or optionally comprising one or more than one additional heteroatom, and mixtures thereof;
$A_{de}$ and $A_{ea}$, equal to or different from each other, are independently a linear or branched divalent alkylene group.

3. The fluoropolymer composition of claim 1, wherein the mixture (M) comprises, in addition to DMSO:
(i) at least one of the diester ($I'_{de}$) and at least one diester ($I''_{de}$), optionally in combination with at least one diester of formula ($II_{de}$); or
(ii) at least one of the esteramide ($I'_{ea}$) and at least one esteramide ($I''_{ea}$), optionally in combination with at least one esteramide of formula ($II_{ea}$); or
(iii) combinations of (i) and (ii),
wherein:
($I'_{de}$) is $R^1$—OOC-$A_{MG}$-COO—$R^2$
($I'_{ea}$) is $R^1$—OOC-$A_{MG}$-CO—$NR^3R^4$
($I''_{de}$) is $R^1$—OOC-$A_{ES}$-COO—$R^2$
($I''_{ea}$) is $R^1$—OOC-$A_{ES}$-CO—$NR^3R^4$;
($II_{ea}$) is $R^1$—OOC—$(CH_2)_4$—CO—$NR^3R^4$; and
($II_{de}$) is $R^1$—OOC—$(CH_2)_4$—COO—$R^2$,
wherein:
$A_{MG}$ is of formula $MG_a$ —CH(CH$_3$)—CH$_2$—CH$_2$— or $MG_b$ CH$_2$—CH$_2$—CH(CH$_3$)—,
$A_{ES}$ is of formula $ES_a$ —CH(C$_2$H$_5$)—CH$_2$—, or $ES_b$— CH$_2$—CH(C$_2$H$_5$)—; and wherein $R^1$ and $R^2$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups;
$R^3$ and $R^4$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups optionally comprising one or more than one substituent, optionally having one or more than one heteroatom, or wherein $R^3$ and $R^4$ form a cyclic moiety including and the nitrogen atom to which they are bound, said cyclic moiety optionally comprising one or more than one additional heteroatom.

4. The fluoropolymer composition of claim 1, wherein mixture (M) comprises, in addition to DMSO:
(k) at least one of the diester ($III^4_{de}$), at least one diester ($III^3_{de}$), and at least one diester of formula ($III^2_{de}$);
(kk) at least one of the esteramide ($III^4_{ea}$), at least one esteramide ($III^3_{ea}$), and at least one esteramide of formula ($III^2_{ea}$); or
(kkk) combinations of (k) and (kk),
wherein:
($III^4_{de}$) is $R^1$—OOC—$(CH_2)_4$—COO—$R^2$
($III^3_{de}$) is $R^1$—OOC—$(CH_2)_3$—COO—$R^2$
($III^2_{de}$) is $R^1$—OOC—$(CH_2)_2$—COO—$R^2$
($III^4_{ea}$) is $R^1$—OOC—$(CH_2)_4$—CO—$NR^3R^4$
($III^3_{ea}$) is $R^1$—OOC—$(CH_2)_3$—CO—$NR^3R^4$
($III^2_{ea}$) is $R^1$—OOC—$(CH_2)_2$—CO—$NR^3R^4$
wherein $R^1$ and $R^2$, equal to or different from each other, are independently $C_1$-$C_{20}$ alkyl, $C_1$-$C_{20}$ aryl, $C_1$-$C_{20}$ alkyaryl, $C_1$-$C_{20}$ arylalkyl groups;
$R^3$ and $R^4$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups optionally comprising one or more than one substituent, optionally having one or more than one heteroatom, or wherein $R^3$ and $R^4$ form a cyclic moiety including the nitrogen atom to which they are bound, said cyclic moiety optionally comprising one or more than one additional heteroatom.

5. The fluoropolymer composition of claim 1, wherein the polymer (A) is a per(halo)fluoropolymer selected from the group consisting of copolymers of tetrafluoroethylene (TFE) with at least one per(halo)fluoromonomer (PFM) different from TFE, said per(halo)fluoromonomer (PFM) being selected from the group consisting of:
$C_3$-$C_8$ perfluoroolefins;
$C_2$-$C_6$ perhalofluoroolefins comprising at least one halogen different from fluorine;
per(halo)fluoroalkylvinylethers complying with general formula $CF_2$=$CFOR_{f1}$ in which $R_{f1}$ is a $C_1$-$C_6$ per(halo)fluoroalkyl, optionally comprising one or more than one halogen atom different from F;
per(halo)fluoro-oxyalkylvinylethers complying with general formula $CF_2$=$CFOX_{01}$, in which $X_{01}$ is a $C_1$-$C_{12}$ per(halo)fluorooxyalkyl optionally comprising halogen atoms different from F, having one or more ether groups;
per(halo)fluoro-methoxy-alkylvinylethers complying with general formula $CF_2$=$CFOCF_2OR_{f2}$ in which $R_{f2}$ is a $C_1$-$C_6$ per(halo)fluoroalkyl, optionally comprising halogen atoms different from F, or a $C_1$-$C_6$ per(halo)fluorooxyalkyl, optionally comprising halogen atoms different from F, having one or more ether groups;
per(halo)fluorodioxoles of formula:

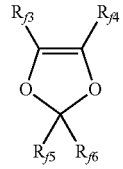

wherein each of $R_{f3}$, $R_{f4}$, $R_{f5}$, $R_{f6}$, equal of different each other, is independently a fluorine atom, a $C_1$-$C_6$ per(halo)fluoroalkyl group, optionally comprising one or more oxygen atom, optionally comprising halogen atoms different from F.

6. The fluoropolymer composition of claim 4, wherein the polymer (A) is selected from the group consisting of TFE copolymers comprising recurring units derived from hexafluoropropylene (HFP) and optionally from at least one perfluoroalkylvinylether complying with general formula $CF_2$=$CFOR_{f1}$, in which $R_{f1}$ is a $C_1$-$C_6$ perfluoroalkyl.

7. The fluoropolymer composition of claim 4, wherein polymer (A) is selected from the group consisting of TFE copolymers comprising recurring units derived from at least one per(halo)fluoroalkylvinylethers complying with general formula $CF_2$=$CFOR_{f1}$ in which $R_{f1}$ is a $C_1$-$C_6$ per(halo)fluoroalkyl, optionally comprising one or more than one halogen atom different from F; and optionally further comprising recurring units derived from at least one $C_3$-$C_8$ perfluoroolefins.

8. The fluoropolymer composition of claim 1, wherein polymer (PI) is a polyamideimide (PAT), said polyamideimide (PAT) being a polymer comprising more than 50% moles of recurring units comprising at least one aromatic ring, at least one imide group, as such and/or in its amic acid form, and at least one amide group which is not included in the amic acid form of an imide group [recurring units ($R_{PAI}$)], said recurring units ($R_{PAI}$) being selected from the group consisting of:

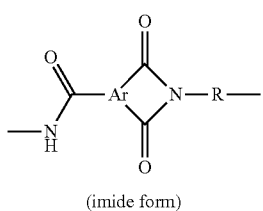

(imide form)

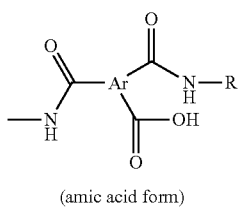

(amic acid form)

wherein:

Ar is a trivalent aromatic group;

R is a divalent aromatic group.

9. The fluoropolymer composition of claim 1, wherein compound (B) complies with any of formulas (II), (III) and (IV) herein below:

Formula (II)

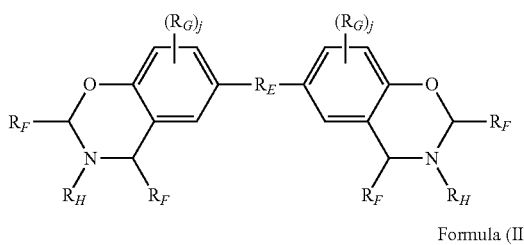

Formula (III)

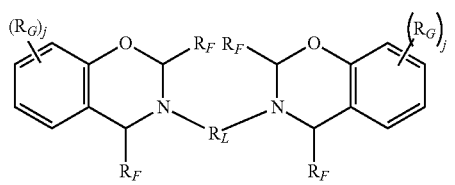

Formula (IV)

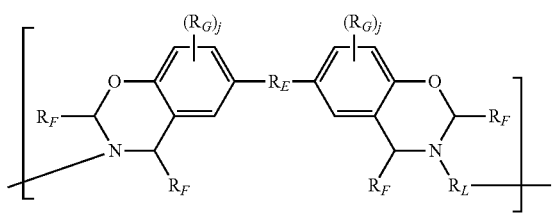

wherein $R_E$ is a covalent bond or a divalent group selected from the group consisting of —O—, —S—, —SO$_2$—, —(CH$_2$)$_m$—, with m being an integer from 1 to 6, —C(O)—, —C(CF$_3$)$_2$—, —(CF$_2$)$_n$— n being an integer from 1 to 6, and groups of formulas:

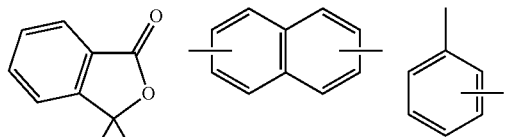

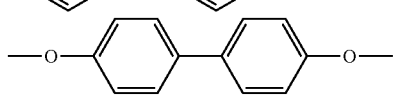

with

Y being a covalent bond or a divalent group selected from the group consisting of —O—, —S—, —SO$_2$—, —(CH$_2$)$_m$—, with m being an integer from 1 to 6, —C(O)—, —C(CF$_3$)$_2$—, —(CF$_2$)$_n$—, n being an integer from 1 to 6;

$R_L$ is a divalent group selected from the group consisting of divalent $C_1$-$C_{12}$ aliphatic groups, linear or branched, or an aromatic group of formula:

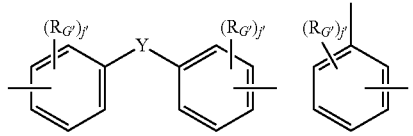

with Z being a covalent bond or a divalent group selected from the group consisting of —O—, —S—, —SO$_2$—, —(CH$_2$)$_m$—, with m being an integer from 1 to 6, —C(O)—, —C(CF$_3$)$_2$—, —(CF$_2$)$_n$—, n being an integer from 1 to 6;

j and j', equal to or different from each other at each occurrence, is zero or is an integer of 1 to 3;

each of $R_G$ and $R_{G'}$, equal or different at each occurrence, is a halogen or a $C_1$-$C_{36}$ hydrocarbon group, optionally comprising heteroatoms;

each of $R_F$, equal to or different at each occurrence, is H or a $C_1$-$C_{12}$ alkyl group;

each of $R_H$ is a $C_1$-$C_{36}$ hydrocarbon group, optionally comprising heteroatoms.

10. The composition according to claim 9, wherein compound (B) is selected from the group consisting of compounds (B-1) to (B-5) listed below:

Formula (B-1)

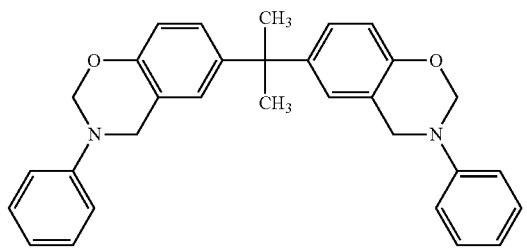

-continued

Formula (B-2)
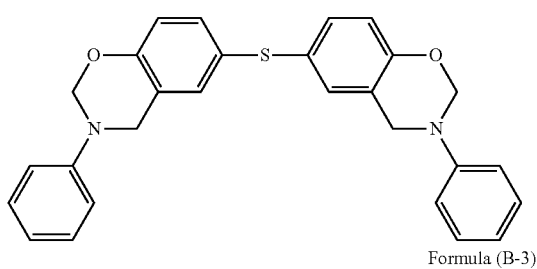

Formula (B-3)
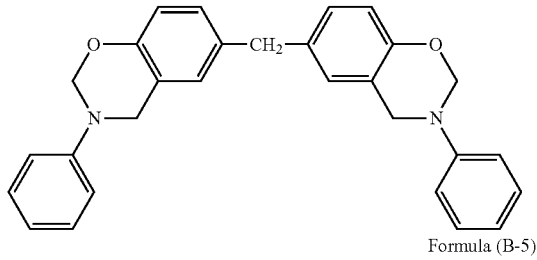

Formula (B-4)

Formula (B-5)
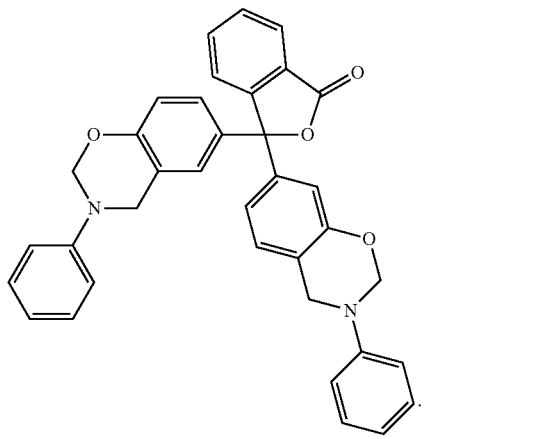

11. A process for manufacturing the fluoropolymer composition according to claim 1, the process comprising mixing polymer (A), polymer (P), mixture (M) and, when present, all other additional ingredients.

12. A method for coating a surface, including a step of coating the composition according to claim 1 onto said surface, so as to obtain a wet coating layer on said surface.

13. The method of claim 12, said method comprising a subsequent step of drying at temperatures ranging from room temperature to about 200° C., said wet coating layer, so as to obtain a dried coating layer onto said surface.

14. The method of claim 12, wherein said dried coating layer is further coated with at least one additional layer of a fluoropolymer, so as to provide one or more than one outer fluoropolymer layer assembled onto the dried coating layer onto the surface.

15. The fluoropolymer composition of claim 8, wherein Ar is a trivalent aromatic group selected from the group consisting of:

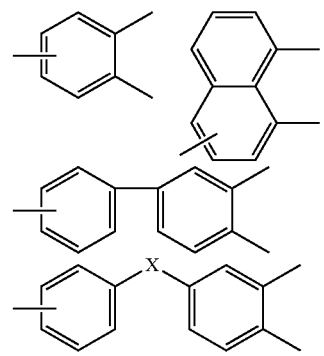

and corresponding optionally substituted structures, wherein X is selected from —O—, —C(O)—, —CH$_2$—, —C(CF$_3$)$_2$—, and —(CF$_2$)$_n$—, and n is an integer from 1 to 5.

16. The fluoropolymer composition of claim 8, wherein R is a divalent aromatic group selected from the group consisting of:

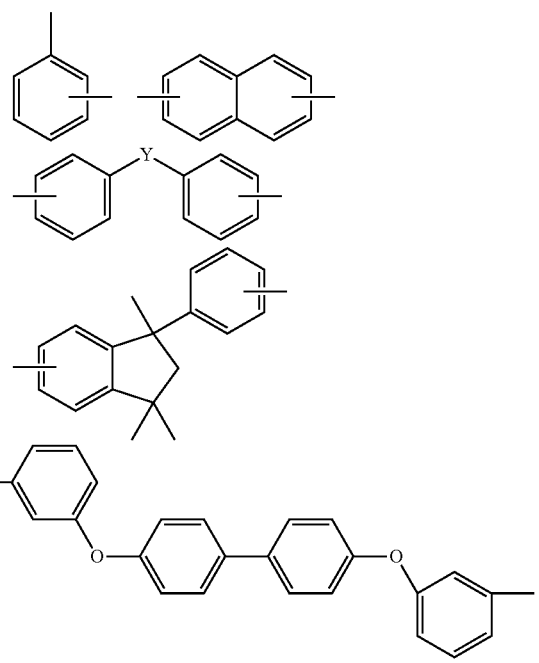

and corresponding optionally substituted structures, wherein Y is selected from —O—, —S—, —SO$_2$—, —CH$_2$—, —C(O)—, —C(CF$_3$)$_2$—, and —(CF$_2$)$_n$—, and n is an integer from 0 to 5.

* * * * *